United States Patent
Smith, Jr. et al.

(10) Patent No.: US 6,561,305 B2
(45) Date of Patent: May 13, 2003

(54) HYDRAULIC CLUTCHING STEERING DAMPER

(75) Inventors: Ronald G. Smith, Jr., New Carlisle, OH (US); William C. Kruckemeyer, Beavercreek, OH (US); Michael L. Oliver, Xenia, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/851,464

(22) Filed: May 8, 2001

(65) Prior Publication Data

US 2002/0166713 A1 Nov. 14, 2002

(51) Int. Cl.7 .............................. B62D 1/184; B62D 9/00
(52) U.S. Cl. ..................... 180/428; 180/427; 280/89; 280/780
(58) Field of Search ................. 280/779, 780, 280/89, 90; 180/400, 417, 426, 427, 428

(56) References Cited

U.S. PATENT DOCUMENTS

| | | | | |
|---|---|---|---|---|
| 3,876,030 A | * | 4/1975 | Komamura et al. | ... 180/79.2 D |
| 4,398,173 A | | 8/1983 | Kulischenko et al. | |
| 4,458,915 A | | 7/1984 | Emery | |
| 5,289,893 A | * | 3/1994 | Yamamoto et al. | ......... 180/132 |
| 5,538,096 A | * | 7/1996 | Breitweg | ..................... 180/429 |
| 5,893,430 A | * | 4/1999 | Koike | ......................... 180/443 |
| 6,135,224 A | | 10/2000 | Thomas et al. | |
| 6,164,320 A | | 12/2000 | Hamano et al. | |

FOREIGN PATENT DOCUMENTS

JP          2000-15913      *  6/2000

* cited by examiner

Primary Examiner—Avraham Lerner
(74) Attorney, Agent, or Firm—Scott A. McBain

(57) ABSTRACT

A damper for a vehicle rack and pinion-type power steering system reduces or eliminates high frequency and low amplitude vibrations commonly associated with high-speed steering wheel shake. The damper includes a hydraulically actuated clutch that is energized by a spring in the damper. The damper locks or inhibits rotation of a steering shaft coupled to the rack and pinion assembly while the vehicle is traveling straight down the road to absorb the input energy and cancel any vibration from the wheels, suspension or road. The clutch is released when there is any steering wheel input from the operator. Increased pressure from the power steering pump as a result of steering wheel input increases the pressure in the damper to compress a spring and release the multi-disk clutch. This allows the steering system to behave in an acceptable manner by not adding any friction or extra force requirements to the driver and providing acceptable feel and return to center characteristics for the steering system.

20 Claims, 2 Drawing Sheets

HYDRAULIC CLUTCHING STEERING DAMPER

BACKGROUND OF THE INVENTION

This invention relates to power steering systems for automotive vehicles and, more particularly, to a damper for a rack and pinion power steering system in an automotive vehicle.

Steering systems on vehicles equipped with a rack and pinion-type steering frequently experience high speed steering wheel shake. High-speed shake of the steering wheel is detrimental to the feel of the steering. Prior attempts to reduce or eliminate such high-speed shake or vibrations have proven unsuccessful. The normal means of attenuating high-speed shake are ineffective on vehicles with rack and pinion-type steering systems. The primary reason that prior attempts to reduce or eliminate high-speed shake and vibrations of this type have not been effective for rack and pinion-type systems are the mounting and frequency requirements.

Previously, linear dampers were used to dampen steering wheel oscillations or vibrations. Linear dampers are commonly effective on larger vehicles, which have large displacement steering systems because the linear damper devices focus on the steering system velocity. Rack and pinion-type systems typically have a high frequency and low amplitude vibration or shake and linear dampers are not adequately suited to address vibrations of this type. The low amplitude vibration does not provide sufficient velocity for the linear damper to effectively operate.

Other devices which have been used to address high-speed steering wheel shake include constant friction-type interfaces. However, such approaches have also proven to be unacceptable for rack and pinion-type steering systems because the feel and return to center characteristics of the steering system are detrimentally impacted or destroyed with constant friction-type interfaces.

Therefore, a need exists for a damper for high speed shake and vibrations of high frequency and low amplitude in rack and pinion-type systems while still providing good responsive feeling to the steering wheel and return to center characteristics.

SUMMARY OF THE INVENTION

This invention solves the above-described and other problems common in vehicle rack and pinion-type steering systems. The present invention offers a good responsive feel in a neutral position of the steering wheel during high speed running of the vehicle and desirable return to center characteristics of the steering system.

In one embodiment of this invention, a power steering system for a vehicle includes a steering wheel coupled to a rack and pinion assembly. A damper is coupled to the pinion of the rack and pinion assembly and is also in hydraulic communication with a pressure pump. The damper includes a generally fixed housing having a keyway on an interior surface of the housing. A steering shaft is inserted into the housing and includes a spline portion and an output end, which is coupled to the pinion of the rack and pinion assembly. A clutch in the housing engages the spline portion of the steering shaft as well as the keyway on the interior of the housing. The clutch is biased by a spring to inhibit rotation of the steering shaft relative to the housing and thereby dampen the high-speed shake, vibrations or other oscillations being transmitted in the power steering system. The damper locks or inhibits the steering shaft from rotating relative to the housing while the vehicle is traveling straight down the road to absorb the input energy and cancel any vibration from the wheels, suspension or road.

The clutch is automatically disengaged upon movement of the steering wheel by an operator. Pressure from the power steering pump increases when there is steering wheel input and the increase in pressure is communicated through a port in the housing of the damper to release the clutch and allow the steering to turn freely. When the pressure in the power steering pump increases, the pressure in the damper likewise increases to thereby disengage the clutch by overcoming the bias of the springs and allowing the steering shaft to turn freely.

In one embodiment, the clutch utilizes a multi-disk arrangement with two types of disks. Disks of the first type are each interposed between a pair of disks of the second type. The first type of disk includes a tooth on an inner circumference thereof, which engages the spline portion of the steering shaft. The second type of disk includes a key on an outer circumference thereof, which engages the keyway on the interior of the fixed housing. The spring in the damper biases the disks into engagement with each other thereby inhibiting or preventing rotation of the first type of disk relative to the second type of disk and likewise rotation of the steering shaft relative to the housing to dampen vibrations or high speed shake being transmitted in the power steering system. Once the operator moves the steering wheel, the pressure in the hydraulic pump increases which is communicated to the interior of the damper housing through the port. The increase in pressure acts on a piston positioned between the disks and the spring to thereby compress the spring and release the disks for rotation relative to each other. Once the disks are permitted to rotate relative to each other, the steering shaft rotates relative to the housing to provide normal steering operation of the vehicle.

BRIEF DESCRIPTION OF THE DRAWINGS

The objectives and features of the invention will become more readily apparent from the following detailed description taken in conjunction with the accompanying drawings in which.

DETAILED DESCRIPTION OF THE INVENTION

Figure 1:
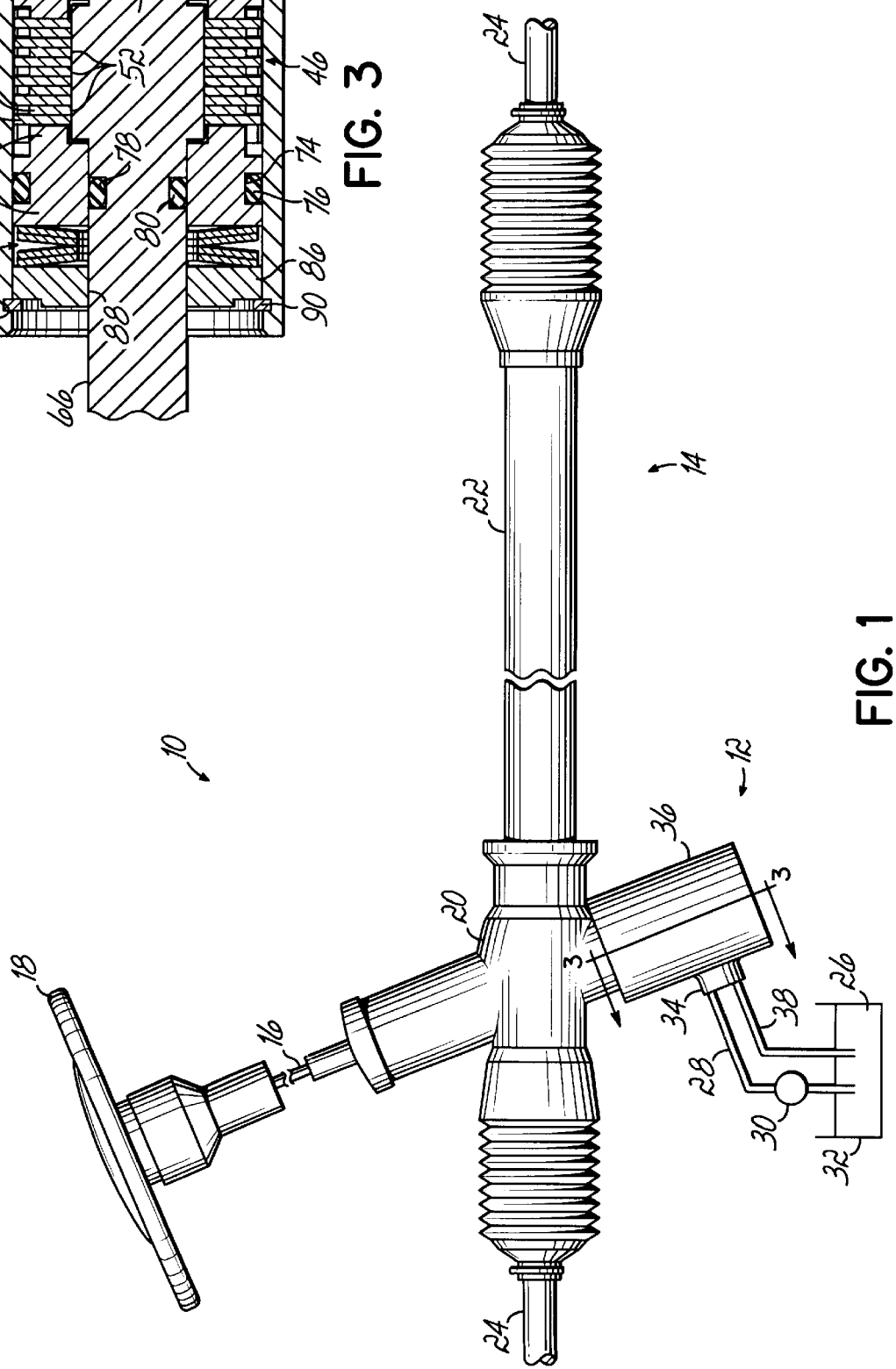
FIG. 1 is a schematic perspective view of one embodiment of a hydraulic clutch steering damper and vehicle power steering system according to this invention.

Referring to FIG. 1, a hydraulic power steering system 10 includes a damper 12 for reducing, minimizing and/or eliminating input energy, high-speed shake vibrations from the wheel, suspension or road being transmitted in the power steering system 10. Specifically, the power steering system 10 is a rack and pinion-type assembly 14 where an input shaft 16 is connected to a steering wheel 18 of a vehicle at a gearbox 20. A rack (not shown) meshing with a pinion gear (not shown) coupled to the shaft 16 is located within the gear box 20 and a rack shaft and power cylinder portion 22 of the gear box 20 so as to be slidable in left and right position, as shown in FIG. 1. Details of a standard rack and pinion-type system are well known to those skilled in the art.

Left and right tie-rods 24, 24 are respectively connected to the ends of the rack shaft (not shown) located in the rack shaft and power cylinder portion 22 of the gearbox 20. Hydraulic fluid 26 is supplied to the power steering system 10 through a supply line 28 by a hydraulic pressure pump 30 which pumps hydraulic fluid 26, such as oil or the like, to the power steering system 10 from a reservoir 32 and into a port 34 on a housing 36 of the damper 12 according to one embodiment of this invention. The hydraulic fluid 26 is returned to the reservoir by a return line 38.

Accordingly, when the pinion coupled to the shaft 16 of the power steering system 10 meshes with the rack, the tie rods 24, 24 are moved integrally in the left or right direction according to the driver input on the steering wheel 18, which is transmitted through the input shaft 16 to the steering system 10.

Figure 3:
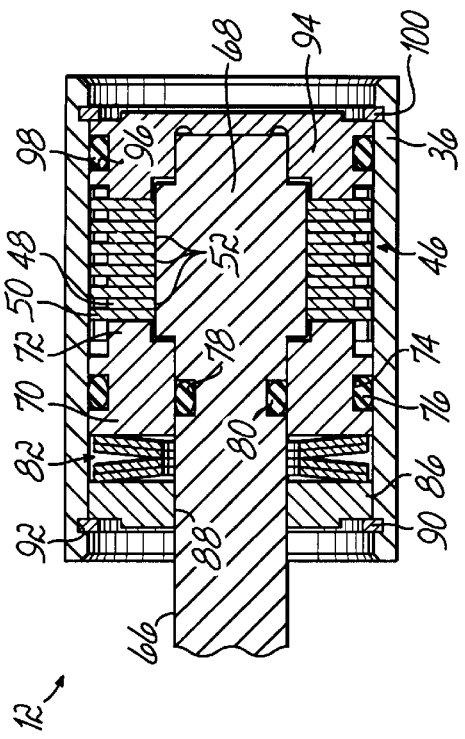
FIG. 3 is a cross-sectional view taken along line 3—3 of FIG. 1 of the damper according to one embodiment of this invention.
Figure 2:
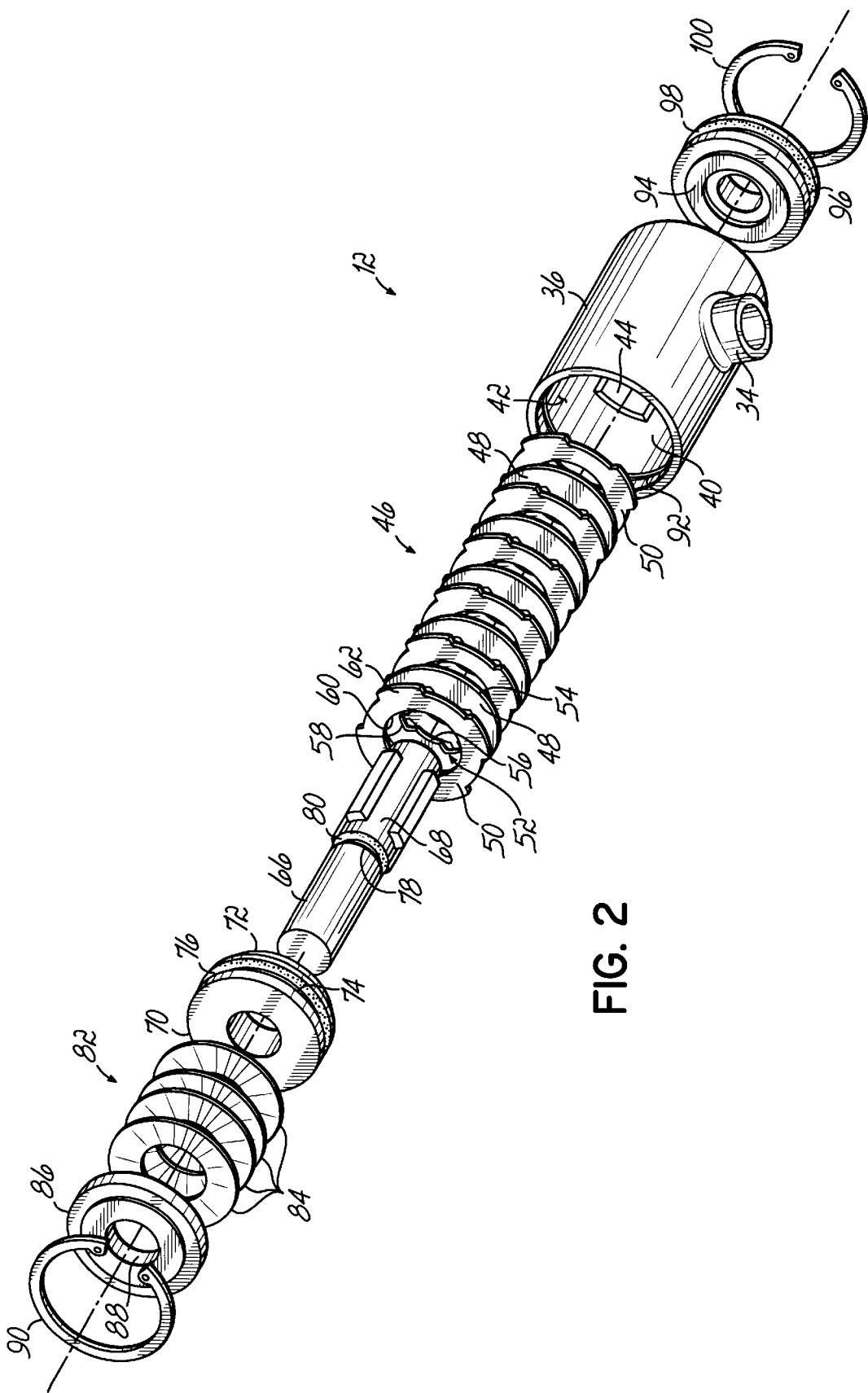
FIG. 2 is an exploded perspective view of the components of the damper of FIG. 1.

The damper 12, as shown more specifically in FIGS. 2 and 3, is connected to the hydraulic pressure pump 30 so that when pressure in the power steering hydraulic fluid system increases as a result of steering wheel 18 input by the operator, the damper 12 is disabled to permit steering or maneuvering. Alternatively, without steering input, when vibrations from the road wheels are transmitted to the power cylinder during running of the vehicle, the damper 12 prevents the vibrations from being transmitted to the steering wheel 18. Additionally, responsive feeling is obtained during high speed running of the vehicle at the neutral position of the steering wheel 18 and return to center characteristics of the steering wheel are maintained with the damper 12 of this invention.

The damper 12 includes the generally cylindrical-shaped housing 36 in one embodiment of this invention. The housing 36 includes a keyway 40 formed on an interior surface 42 thereof. Preferably, multiple evenly spaced keyways 40 are formed on the interior 42 of the housing 36 although only one is visible in FIG. 2. The keyways 40 are formed in the gaps between spaced projections 44 on the interior 42 of the housing 36. The damper 12 also includes a clutch 46, which in a present embodiment includes a plurality of annular disks 48, 50 of a first type and of a second type. Each of the disks 48, 50 has a central throughhole 52. The two types of disks 48, 50 are alternately interleaved with one another so that each disk 48 of a first type is sandwiched between a pair of adjacent disks 50 of a second type. Each of the disks 48, 50 are positioned in face-to-face juxtaposition with the adjacent disk as shown in FIGS. 2 and 3. The disks 48 of the first type have a generally circular outer circumference 54 and four spaced teeth 46 projecting inwardly on the inner circumference 58 of the disk 48, although only one tooth 56 on each disk 48 is visible in FIG. 2. Each disk 50 of the second type includes a generally circular interior circumference 60 and four spaced keys 62 projecting outwardly from an outer circumference 64, as shown in FIG. 2.

The damper 12 has a steering shaft 66 projecting longitudinally through the housing 36. The steering shaft 66 includes a spline portion 68 that projects into and through the throughholes 52 of the clutch disks 48, 50 (FIG. 3).

An annular piston 70 is also mounted in the damper 12 on the steering shaft 66 and includes an annular boss 72 projecting into contact with the clutch 46 and adjacent disk 50 as shown in FIG. 3. An annular groove 74 is formed on the outer circumference of the piston 70 and an O-ring 76 is seated within the groove 74 for sealing contact against the interior surface 42 of the housing 36. The steering shaft 66 also includes an annular groove 78 in which an O-ring 80 is seated for sealing contact with the inner circumference of the annular piston 70.

A spring or other force-inducing or biasing member 82 is positioned adjacent to the piston 70 as shown in FIGS. 2 and 3. In one embodiment, the spring 82 is a series, four of which are shown in FIG. 3, of Belville springs 84 situated on the steering shaft 66. The Belville springs 84 are held within the housing 36 of the damper 12 by an end cap retainer 86 having a central aperture 88 through which the steering shaft 66 projects. A retaining ring 90 is seated within an interior groove 92 of the housing 36 to hold the components of the damper 12 in the housing 36. Similarly, an end cap retainer 94 is positioned on a distal end of the steering shaft 66 to seal the opposite end of the damper 12 as shown in FIG. 3. An annular groove 96 is formed in the outer circumference of the end cap retainer 94 into which an O-ring 98 is placed for sealing contact with the interior surface 42 of the housing 36. A retaining ring 100 is also provided in the opposite end of the housing 36 to hold the components of the damper 12 in the housing 36.

The damper 12 also includes the port 34 in the housing 36 which is in fluid communication with the hydraulic pressure pump 30, supply line 28 and return line 38 as shown in FIG. 1.

The damper 12 of this invention locks the steering shaft 66 and prevents rotation relative to the fixed housing 36 while the vehicle is traveling straight down the road. Fixing the shaft 66 against rotation relative to the housing 36 absorbs the input energy and cancels any vibration from the wheels, suspension or road. The steering shaft 66 is fixed relative to the fixed housing 36 because of the mating engagement of the spline portion 68 of the steering shaft 66 with the teeth 56 on the first type of disks 48 in the clutch 46 and the mating of the keys 62 on the second type of disks 50 in the clutch 46 with the keyways 40 on the interior 42 of the housing 36. When the clutch 46 is engaged, the first and second types of disks 48, 50 are forced into contact with each other by the biasing force of the spring 82 thereby inhibiting or preventing the relative rotation of the first type of disks 48 relative to the second type of disks 50. As such, since the first type of disks 48 are mated with the steering shaft 66 and the second type of disks 50 are mated with the fixed housing 36, relative rotation of the steering shaft 66 to the fixed housing 36 is prevented or inhibited. Therefore, high speed steering shake, vibrations or other input energy from the road, suspension, or wheels is not transmitted through the power steering system 10 to the steering wheel 18.

While Belville springs 84 are shown as one force applying or biasing mechanism, it should be readily appreciated that compression springs or other biasing or force applying members can be used within the scope of this invention. Likewise, other clutch designs can be employed with this invention.

When an operator rotates the steering wheel 18, pressure from the power steering pump 30 increases. This increase in fluid pressure is transmitted through the port 34 to the interior of the damper 12 and forces the piston 70 to compress the spring 82. The compression of the spring 82 releases the clutch 46 thereby permitting rotation of the first type of disks 48 relative to the second type of disks 50 and freeing the steering shaft 66 for rotation relative to the fixed housing 36 and normal steering operation. As such, steering input from the steering wheel 18 is transmitted through the rack and pinion assembly 14 to the wheels. Upon steering input by the operator, the increased hydraulic pressure from the pressure pump 30 is transmitted through the supply line 28 into the housing 36 of the damper 12 to thereby compress the piston 70 and release the clutch 46 for rotation of the first type of disks 48 relative to the second type of disks 50 and the steering shaft 66 relative to the fixed housing 36. When the hydraulic pressure declines, the hydraulic fluid 26 is returned from the damper 12 to the reservoir 23 through the return line 38. As the pressure in the housing 36 decreases, the Belville springs 84 once again exert biasing force on the clutch 46 to inhibit rotation of the first type of disks 48 relative to the second type of disks 50 and block the steering shaft 66 rotation relative to the fixed housing 36.

As a result, the power steering system 10 with the damper 12 according to this invention behaves in an acceptable manner for normal steering operation by not adding any friction or extra force requirements for the driver. Moreover, vibrations which otherwise would be transmitted through the power steering system 10 are canceled while still providing good responsive feeling for the operator and return to center characteristics of the steering wheel 18.

From the above disclosure of the general principles of the present invention and the preceding detailed description of at least one preferred embodiment, those skilled in the art will readily comprehend the various modifications to which this invention is susceptible. Therefore, we desire to be limited only by the scope of the following claims and equivalents thereof.

We claim:

1. A damper for a power steering system of a vehicle comprising:
    a housing;
    a steering shaft inserted into the housing and having an output end coupled to the power steering system;
    a clutch engaging the steering shaft and the housing, the clutch being biased to inhibit rotation of the shaft relative to the housing and thereby dampen vibrations being transmitted in the power steering system; and
    a port in the housing providing hydraulic communication with the power steering system so that an increase in hydraulic pressure transmitted through the port and into the housing overcomes the bias of the clutch and enables rotation of the steering shaft relative to the housing for steering of the vehicle.

2. The damper of claim 1 further comprising:
    a spring in the housing to bias the clutch into engagement with the steering shaft.

3. The damper of claim 2 wherein the spring comprises at least one Belville spring.

4. The damper of claim 2 further comprising:
    a piston in the housing and coupled to the spring so that upon the increase in hydraulic pressure in the housing the piston compresses the spring and releases the clutch to enable rotation of the steering shaft.

5. The damper of claim 1 wherein the clutch further comprises:
    a set of first annular discs and a set of second annular discs, each of the first discs being sandwiched between a pair of the second discs, the first discs engaging the steering shaft and the second discs engaging the housing so that when the first and second discs are biased together the first and second discs are inhibited from rotating relative to each other and the steering shaft is inhibited from rotating relative to the housing thereby dampening vibrations being transmitted in the power steering system.

6. The damper of claim 5 wherein the first and second discs are juxtaposed in face to face relation to one another.

7. The damper of claim 5 further comprising:
    a spline portion on the steering shaft being inserted into the first and second discs; and
    at least one tooth on each of the first discs, each tooth projecting inwardly from an inner circumference of one of the first discs to mate with the spline portion of the steering shaft.

8. The damper of claim 5 further comprising:
    a keyway on an interior surface of the housing; and
    at least one key on each of the second discs, each key projecting outwardly from an outer circumference of one of the second discs to mate with the keyway on the housing.

9. A damper for a power steering system of a vehicle comprising:
    a housing;
    a steering shaft inserted into the housing and having an output end coupled to the power steering system;
    a clutch engaging the steering shaft and the housing, the clutch being biased to inhibit rotation of the shaft relative to the housing and thereby dampen vibrations being transmitted in the power steering system;
    wherein the clutch further comprises a set of first annular discs and a set of second annular discs, each of the first discs being sandwiched between a pair of the second discs, the first discs engaging the steering shaft and the second discs engaging the housing so that when the first and second discs are biased together the first and second discs are inhibited from rotating relative to each other and the steering shaft is inhibited from rotating relative to the housing thereby dampening vibrations being transmitted in the power steering system;
    a spring in the housing to bias the clutch into engagement with the steering shaft; and
    a port in the housing providing hydraulic communication with the power steering system so that an increase in hydraulic pressure transmitted through the port and into the housing overcomes the bias of the spring on the clutch and enables rotation of the steering shaft relative to the housing for steering of the vehicle.

10. The damper of claim 9 further comprising:
    a spline portion on the steering shaft being inserted into the first and second discs;
    at least one tooth on each of the first discs, each tooth projecting inwardly from an inner circumference of one of the first discs to mate with the spline portion of the steering shaft;
    a keyway on an interior surface of the housing; and
    at least one key on each of the second discs, each key projecting outwardly from an outer circumference of one of the second discs to mate with the keyway on the housing.

11. A damper for a power steering system of a vehicle comprising:
    a housing;
    a keyway on an interior surface of the housing;
    a steering shaft inserted into the housing, the steering shaft having a spline portion and an output end coupled to the power steering system;
    a clutch engaging the steering shaft and the housing, the clutch being biased to inhibit rotation of the shaft relative to the housing and thereby dampen vibrations being transmitted in the power steering system;

wherein the clutch further comprises a set of first annular discs and a set of second annular discs, each of the first discs being sandwiched between a pair of the second discs, the first discs engaging the spline portion of the steering shaft and the second discs engaging the keyway on the housing so that when the first and second discs are biased together the first and second discs are inhibited from rotating relative to each other and the steering shaft is inhibited from rotating relative to the housing thereby dampening vibrations being transmitted in the power steering system;

at least one tooth on each of the first discs, each tooth projecting inwardly from an inner circumference of one of the first discs to mate with the spline portion of the steering shaft;

at least one key on each of the second discs, each key projecting outwardly from an outer circumference of one of the second discs to mate with the keyway on the housing;

a spring in the housing to bias the first and second discs into engagement with each other; and a port in the housing providing hydraulic communication with the power steering system so that an increase in hydraulic pressure transmitted through the port and into the housing overcomes the bias of the spring on the clutch and enables rotation of the first and second discs relative to each other and of the steering shaft relative to the housing for steering of the vehicle.

12. A power steering system for a vehicle comprising:
a steering wheel;
a rack and pinion assembly coupled to the steering wheel;
a hydraulic pressure pump;
a damper coupled to the rack and pinion assembly and in hydraulic communication with the pressure pump, wherein the damper further comprises:
(a) a housing;
(b) a steering shaft inserted into the housing and having an output end coupled to the rack and pinion assembly;
(c) a clutch engaging the steering shaft and the housing, the clutch being biased to inhibit rotation of the shaft relative to the housing and thereby dampen vibrations being transmitted in the power steering system; and
(d) a port in the housing providing hydraulic communication with the pressure pump so that an increase in hydraulic pressure transmitted through the port and into the housing overcomes the bias of the clutch and enables rotation of the steering shaft relative to the housing for steering of the vehicle.

13. The power steering system of claim 12 further comprising:
a spring in the housing to bias the clutch into engagement with the steering shaft.

14. The power steering system of claim 13 further comprising:
a piston in the housing and coupled to the spring so that upon the increase in hydraulic pressure in the housing the piston compresses the spring and releases the clutch to enable rotation of the steering shaft.

15. The power steering system of claim 12 wherein the clutch further comprises:
a set of first annular discs and a set of second annular discs, each of the first discs being sandwiched between a pair of the second discs, the first discs engaging the steering shaft and the second discs engaging the housing so that when the first and second discs are biased together the first and second discs are inhibited from rotating relative to each other and the steering shaft is inhibited from rotating relative to the housing thereby dampening vibrations being transmitted in the power steering system.

16. The power steering system of claim 15 wherein the first and second discs are juxtaposed in face to face relation to one another.

17. The power steering system of claim 15 further comprising:
a spline portion on the steering shaft being inserted into the first and second discs; and
at least one tooth on each of the first discs, each tooth projecting inwardly from an inner circumference of one of the first discs to mate with the spline portion of the steering shaft.

18. The power steering system of claim 15 further comprising:
a keyway on an interior surface of the housing; and
at least one key on each of the second discs, each key projecting outwardly from an outer circumference of one of the second discs to mate with the keyway on the housing.

19. A power steering system for a vehicle comprising:
a steering wheel;
a rack and pinion assembly coupled to the steering wheel;
a hydraulic pressure pump;
a damper coupled to the rack and pinion assembly and in hydraulic communication with the pressure pump, wherein the damper further comprises:
(a) a housing;
(b) a steering shaft inserted into the housing and having an output end coupled to the rack and pinion assembly;
(c) a clutch engaging the steering shaft and the housing, the clutch being biased to inhibit rotation of the shaft relative to the housing and thereby dampen vibrations being transmitted in the power steering system;
wherein the clutch further comprises a set of first annular discs and a set of second annular discs, each of the first discs being sandwiched between a pair of the second discs, the first discs engaging the steering shaft and the second discs engaging the housing so that when the first and second discs are biased together the first and second discs are inhibited from rotating relative to each other and the steering shaft is inhibited from rotating relative to the housing thereby dampening vibrations being transmitted in the power steering system;
(d) a spring in the housing to bias the clutch into engagement with the steering shaft; and
(e) a port in the housing providing hydraulic communication with the pressure pump so that an increase in hydraulic pressure transmitted through the port and into the housing overcomes the bias of the spring on the clutch and enables rotation of the steering shaft relative to the housing for steering of the vehicle.

20. A power steering system for a vehicle comprising:
a steering wheel;
a rack and pinion assembly coupled to the steering wheel;
a hydraulic pressure pump;
a damper coupled to the rack and pinion assembly and in hydraulic communication with the pressure pump, wherein the damper further comprises:

(a) a housing;
(b) a keyway on an interior surface of the housing;
(c) a steering shaft inserted into the housing, the steering shaft having a spline portion and an output end coupled to the rack and pinion assembly;
(d) a clutch engaging the steering shaft and the housing, the clutch being biased to inhibit rotation of the shaft relative to the housing and thereby dampen vibrations being transmitted in the power steering system; wherein the clutch further comprises a set of first annular discs and a set of second annular discs, each of the first discs being sandwiched between a pair of the second discs, the first discs engaging the spline portion of the steering shaft and the second discs engaging the keyway on the housing so that when the first and second discs are biased together the first and second discs are inhibited from rotating relative to each other and the steering shaft is inhibited from rotating relative to the housing thereby dampening vibrations being transmitted in the power steering system;
(e) at least one tooth on each of the first discs, each tooth projecting inwardly from an inner circumference of one of the first discs to mate with the spline portion of the steering shaft;
(f) at least one key on each of the second discs, each key projecting outwardly from an outer circumference of one of the second discs to mate with the keyway on the housing;
(g) a spring in the housing to bias the first and second discs into engagement with each other; and
(h) a port in the housing providing hydraulic communication with the pressure pump so that an increase in hydraulic pressure transmitted through the port and into the housing overcomes the bias of the spring on the clutch and enables rotation of the first and second discs relative to each other and of the steering shaft relative to the housing for steering of the vehicle.

* * * * *